(12) United States Patent
Tremblay et al.

(10) Patent No.: US 7,711,928 B2
(45) Date of Patent: May 4, 2010

(54) METHOD AND STRUCTURE FOR EXPLICIT SOFTWARE CONTROL USING SCOREBOARD STATUS INFORMATION

(75) Inventors: Marc Tremblay, Menlo Park, CA (US); Shailender Chaudhry, San Francisco, CA (US); Quinn A. Jacobson, Sunnyvale, CA (US)

(73) Assignee: Oracle America, Inc., Menlo Park, CA (US)

( * ) Notice: Subject to any disclaimer, the term of this patent is extended or adjusted under 35 U.S.C. 154(b) by 467 days.

(21) Appl. No.: 11/082,282

(22) Filed: Mar. 16, 2005

(65) Prior Publication Data

US 2005/0223194 A1 Oct. 6, 2005

Related U.S. Application Data

(60) Provisional application No. 60/558,391, filed on Mar. 31, 2004.

(51) Int. Cl.
*G06F 9/30* (2006.01)
(52) U.S. Cl. .................. 712/217; 712/216; 712/234
(58) Field of Classification Search .............. 712/216, 712/217, 234
See application file for complete search history.

(56) References Cited

U.S. PATENT DOCUMENTS

| | | | | |
|---|---|---|---|---|
| 3,577,189 | A * | 5/1971 | Cocke et al. ............ | 712/219 |
| 5,276,828 | A | 1/1994 | Dion | |
| 5,442,760 | A * | 8/1995 | Rustad et al. ............ | 712/215 |
| 5,454,117 | A | 9/1995 | Puziol et al. ............ | 395/800 |
| 5,511,172 | A * | 4/1996 | Kimura et al. ........... | 712/235 |
| 5,651,124 | A | 7/1997 | Shen et al. | |
| 5,682,493 | A * | 10/1997 | Yung et al. ............. | 712/217 |
| 5,692,168 | A | 11/1997 | McMahan .............. | 395/584 |
| 5,748,630 | A * | 5/1998 | Bergantino et al. ........ | 370/412 |
| 5,748,631 | A * | 5/1998 | Bergantino et al. ........ | 370/398 |
| 5,761,515 | A | 6/1998 | Barton, III et al. ........ | 395/709 |

(Continued)

FOREIGN PATENT DOCUMENTS

EP 788054 A2 * 8/1997

(Continued)

OTHER PUBLICATIONS

Tanenbaum, Andrew S. "Structured Computer Organization". Second Edition. Englewood Cliffs, New Jersey: Prentice-Hall, Inc., © 1984. pp. 10-12.*

(Continued)

*Primary Examiner*—Aimee J Li
(74) *Attorney, Agent, or Firm*—Gunnison, McKay & Hodgson, L.L.P.; Forrest Gunnison

(57) ABSTRACT

A user is provided with means to sample memory hierarchy via software. This allows a user to enhance memory-level parallelism via software. A status of information needed for execution of a second computer program instruction is read in response to execution of a first computer program instruction. Execution continues with execution of the second computer program instruction upon the status being a first status. Alternatively, a third computer program instruction is executed upon the status being a second status different from the first status. Thus, execution of the first computer program instruction allows control of the memory hierarchy, which in turn give the user control of the memory hierarchy.

18 Claims, 6 Drawing Sheets

U.S. PATENT DOCUMENTS

| | | | |
|---|---|---|---|
| 5,794,025 A * | 8/1998 | Bergantino et al. | 712/234 |
| 5,860,148 A * | 1/1999 | Bergantino et al. | 711/209 |
| 5,901,308 A | 5/1999 | Cohn et al. | |
| 5,923,863 A | 7/1999 | Adler et al. | |
| 5,950,007 A | 9/1999 | Nishiyama et al. | 395/707 |
| 6,016,542 A | 1/2000 | Gottlieb et al. | 712/225 |
| 6,065,115 A | 5/2000 | Sharangpani et al. | 712/235 |
| 6,219,781 B1 * | 4/2001 | Arora | 712/217 |
| 6,260,135 B1 * | 7/2001 | Yoshida | 712/214 |
| 6,304,955 B1 * | 10/2001 | Arora | 712/217 |
| 6,359,891 B1 * | 3/2002 | Bergantino et al. | 370/398 |
| 6,370,639 B1 | 4/2002 | Huck et al. | 712/222 |
| 6,393,553 B1 | 5/2002 | Arimilli et al. | 712/217 |
| 6,415,380 B1 | 7/2002 | Sato | 712/217 |
| 6,662,360 B1 | 12/2003 | Hay et al. | |
| 6,715,060 B1 * | 3/2004 | Arnold et al. | 712/217 |
| 6,854,048 B1 | 2/2005 | Dice | |
| 7,100,157 B2 | 8/2006 | Collard | 717/161 |
| 2003/0033510 A1 | 2/2003 | Dice | 712/235 |
| 2003/0226002 A1 | 12/2003 | Boutaud et al. | |
| 2005/0204119 A1 | 9/2005 | Saha | |

FOREIGN PATENT DOCUMENTS

| | | |
|---|---|---|
| EP | 0 933 698 | 8/1999 |

OTHER PUBLICATIONS

DeHon, "Instruction Level Parallelism", *CS184b: Computer Architecture (Abstractions and Optimizations)*, Caltech, CA, slides 1-66, Apr. 7, 2003.

Fred Chong, "Lecture 2: Caches and Advanced Pipelining", *ECS 250A Computer Architecture*, UCB, CA, pp. 1-16, 1999.

"Lecture 6: Dealing with Data Hazards(cont'd)", *High Performance Computer Architecture*, slides 1-46, Oct. 9, 2002.

Kunle Olukotun, "Lecture 9: Dynamic Scheduling", slides 1-28, Stanford University, CA.

Huiyang Zhou, et al., "Enhancing Memory Level Parallelism via Recovery-Free Value Prediction", ICS '03, ACM, San Francisco, CA, pp. 1-10, Jun. 2003.

Kevin W. Rudd, et al., "Instruction-Level Parallel Processors-Dynamic and Static Scheduling Tradeoffs", Stanford University Computer Systems Laboratory, Stanford University, CA, pp. 1-8, Mar. 1997.

Kevin Krewell, "Sun Weaves Multithreaded Future", *Microprocessor Report*, Scottsdale, AZ, pp. 1-3, Apr. 14, 2003.

Andrew Glew, "MLP yes! ILP no!", Intel Microcomputer Research Labs and University of Wisconsin, Madison, 1 page and slides 1-30, 1998.

"The Intel 80960", HMBS, pp. 1-41, Nov. 1, 2002.

Sun Microsystems, Inc., "MAJC™ Architecture Tutorial", Palo Alto, CA, pp. 1-31, 1999.

Mutlu et al., "Runahead Execution: An Alternative to Very Large Instruction Windows for Out-of-order Processors", HPCA '03, Feb. 2003, pp. 1-12.

Fu et al., "Software-Only Value Speculation Scheduling", pp. 1-23 [online]. Retrieved on Jun. 1, 1998 from the Internet: <URL:http://citeseer.ist.psu.edu/fu98softwareonly.html>. XP-002319610.

Chen et al., "Dynamic Data Dependence Tracking and its Application to Branch Prediction", *Proceedings of the Ninth International Symposium on High-Performance Computer Architecture*, Feb. 8, 2003, pp. 65-76, IEEE, Piscataway, NJ. XP010629502.

* cited by examiner

METHOD AND STRUCTURE FOR EXPLICIT SOFTWARE CONTROL USING SCOREBOARD STATUS INFORMATION

RELATED APPLICATIONS

This application claims the benefit of U.S. Provisional Application No. 60/558,391 filed Mar. 31, 2004 entitled "Method And Structure For Explicit Software Control Using Scoreboard Status Information" and naming Marc Tremblay, Shailender Chaudhry and Quinn A. Jacobson as inventors, which is incorporated herein by reference in its entirety.

BACKGROUND OF THE INVENTION

1. Field of the Invention

The present invention relates generally to enhancing performance of processors, and more particularly to methods for enhancing memory level parallelism.

2. Description of Related Art

Many modern processors attempt to exploit instruction-level parallelism to enhance performance. One common approach is to use dynamic scheduling for out-of-order execution and out-of-order completion for non data-dependent operations.

Typically, a processor 170 used a scoreboard 173 to monitor instructions in flight and to provide status information for each instruction waiting to be dispatched. Typically, once all the source operands were available in a register file 171 or directly from a functional unit and the required functional unit(s) of functional units 172A to 172D were available, as indicated by scoreboard 173, the instruction was dispatched for execution. This centralized the decision-making.

Out-of-order execution exposes more instruction level parallelism to reduce the execution time of source program 130. In out-of-order execution, a number of sequential instructions are fetched into a window where the instructions are executed according only to data dependencies, potentially out-of-order with respect to sequential order.

Exploiting instruction-level parallelism via out-of-order execution facilitated rapid processor performance improvements during the past decade. Continuing this performance growth requires larger and wider instruction windows. However, processor performance is outstripping memory performance and so greater instruction-level parallelism may not result in the expected performance benefits.

Typically, for memory intensive workloads with heavy pointer chasing, for example, sequential cache-misses dominate the overall execution time and enhanced instruction-level parallelism would not result in much, if any, improvement in processor performance in such situations. It has been recognized that memory-level parallelism is needed to significantly reduce execution times for such memory intensive workloads. In fact, memory-level parallelism is currently the number one target for a variety of techniques such as on-chip multiprocessor (CMP), coarse-grained multithreading (CMT), hardware scout, which uses multithreaded capability to scan ahead in the instruction stream to look for opportunities to prefetch data and speculatively traverse an instruction path, deep instruction windows, execute ahead, etc.

Unfortunately, all of these techniques are implemented in hardware and so are typically not accessible to software. Consequently, the software programmer cannot control the memory hierarchy or access to information concerning the memory hierarchy. This makes it difficult to enhance memory-level parallelism via software.

SUMMARY OF THE INVENTION

According to one embodiment of the present invention, the user is provided with means to sample the memory hierarchy via software. This allows a user to enhance memory-level parallelism via software In one embodiment, a status of information needed for execution of a second computer program instruction is read in response to execution of a first computer program instruction. Execution continues with execution of the second computer program instruction upon the status being a first status. Alternatively, a third computer program instruction is executed upon the status being a second status different from the first status. Thus, execution of the first computer program instruction allows control of the memory hierarchy.

In one embodiment, the first computer instruction is a branch on status instruction. In another embodiment, the first computer instruction is a branch on ready instruction and an example of the branch on ready instruction is a branch on integer register ready instruction. In still another embodiment, the first computer instruction is a branch on not ready instruction and an example of the branch on not ready instruction is a branch on integer register not ready instruction.

A structure, for this embodiment, includes means for reading a status of information needed for execution of a second computer program instruction in response to execution of a first computer program instruction. The structure also includes means for continuing with execution of the second computer program instruction upon the status being a first status, and means for continuing, alternatively, with execution of a third computer program instruction upon the status being a second status different from the first status.

These means can be implemented, for example, by using stored computer executable instructions and a processor in a computer system to execute these instructions. The computer system can be a workstation, a portable computer, a client-server system, or a combination of networked computers, storage media, etc.

A computer system, for this embodiment, includes a processor and a memory coupled to the processor and having stored therein instructions wherein upon execution of the instructions on the processor, a method includes:
  reading a status of information needed for execution of a second computer program instruction in response to execution of a first computer program instruction;
  continuing with execution of the second computer program instruction upon the status being a first status; and
  continuing, alternatively, with execution of a third computer program instruction upon the status being a second status different from the first status.

A computer-program product, for this embodiment, includes a medium configured to store or transport computer readable code for a method including:
  reading a status of information needed for execution of a second computer program instruction in response to execution of a first computer program instruction;
  continuing with execution of the second computer program instruction upon the status being a first status; and
  continuing, alternatively, with execution of a third computer program instruction upon the status being a second status different from the first status In another embodiment, a branch on status software instruction is used to expose a scoreboard of a processor. Status information in the scoreboard is used upon execution of the branch on status software instruction to explicitly control which software instruction of a multiplicity of software instructions in a computer source program is executed after execution of the branch on status software instruction.

For this embodiment, a system includes a processor and a memory, coupled to the processor, storing a branch on status instruction. The system also includes a scoreboard wherein execution of the branch of status instruction on the processor exposes the scoreboard.

For this embodiment, a structure includes means for using a branch on status software instruction to expose a scoreboard of a processor. The structure also includes means for using status information in the scoreboard upon execution of the branch on status software instruction to explicitly control which software instruction of a multiplicity of software instructions in a computer source program is executed after execution of the branch on status software instruction.

Again, these means can be implemented, for example, by using stored computer executable instructions and a processor in a computer system to execute these instructions. The computer system can be a workstation, a portable computer, a client-server system, or a combination of networked computers, storage media, etc.

For this embodiment, a computer-program product includes a medium configured to store or transport computer readable code for a method including:

using a branch on status software instruction to expose a scoreboard of a processor; and using status information in the scoreboard upon execution of the branch on status software instruction to explicitly control which software instruction of a multiplicity of software instructions in a computer source program is executed after execution of the branch on status software instruction.

In still another embodiment, a structure includes means for explicit software control of memory-level parallelism by exposing a scoreboard of a processor. The structure also includes means for using status information from the scoreboard in the explicit software control of memory-level parallelism.

These means can be implemented, for example, by using stored computer executable instructions and a processor in a computer system to execute these instructions. The computer system can be a workstation, a portable computer, a client-server system, or a combination of networked computers, storage media, etc.

In still yet another embodiment, memory-level parallelism is placed under explicit software control by exposing a scoreboard of a processor. Status information from the scoreboard is used in the explicit software control of memory-level parallelism.

For this embodiment, a computer-program product includes a medium configured to store or transport computer readable code for a method including:

placing memory-level parallelism under explicit software control by exposing a scoreboard of a processor; and using status information from the scoreboard in the explicit software control of memory-level parallelism.

BRIEF DESCRIPTION OF THE DRAWINGS

In the drawings, elements with the same reference numeral are the same or similar elements. Also, the first digit of a reference numeral indicates the figure number in which the element associated with that reference numeral first appears.

DETAILED DESCRIPTION

Figure 1:
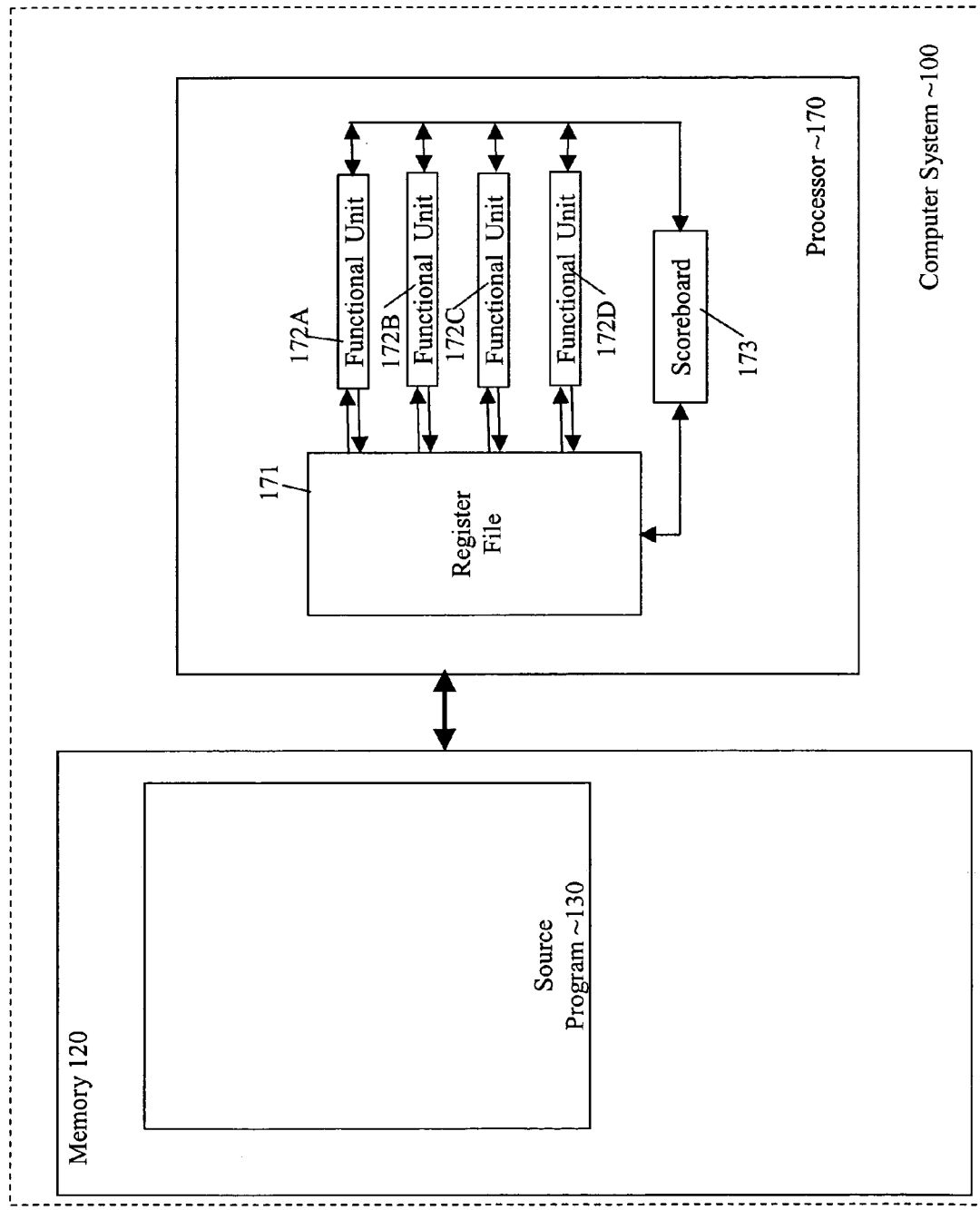
FIG. 1 is a block diagram of a prior art system that included a scoreboard that was visible only to the processor.

According to one embodiment of the present invention, scoreboard 273 (FIG. 2) is made visible to the programmer via execution of an instruction 235 on processor 170. Consequently, the programmer can use information in scoreboard 273, e.g., status information, to explicitly control execution of source program 230. This allows the programmer to use software to enhance memory-level parallelism because instruction 235 gives the programmer explicit control to go somewhere else in program 230 when status information in scoreboard 273 shows that needed data, or perhaps resources, are unavailable.

For example, code segment 231 includes instruction 235 that determines the status, e.g., available or unavailable, of a source operand, for example, and then takes an appropriate action depending upon whether the source operand is available. If instruction 235 determines that the source operand is available, execution of code segment 231 continues. Conversely, if instruction 235 determines that the source operand is unavailable, code in second code segment 232 of source program 230 is executed.

For example, if code segment 231 is a linked list, instruction 235 determines that a load instruction will miss based upon information in scoreboard 273, instruction 235 jumps to code segment 232 that is another linked list.

Thus, instead of stalling on dependent load misses and not achieving high memory-level parallelism, source program 230 detects the miss and jumps to another linked list 232 and tries to traverse it. If there is another miss in linked list 232, the memory-level parallelism is higher. If there is not a miss, great progress is achieved.

Figure 2:
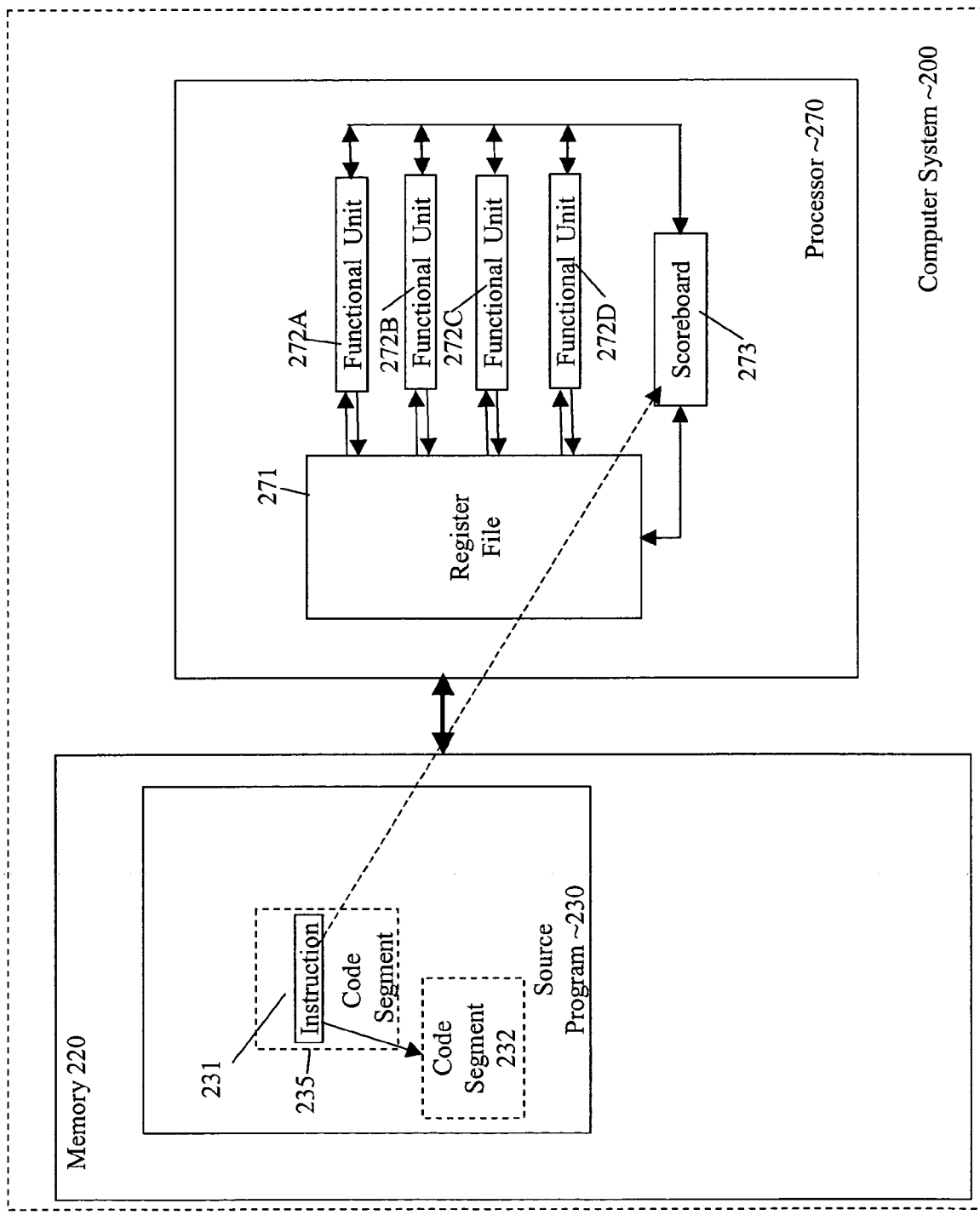
FIG. 2 is a block diagram of a system that includes an instruction that upon execution on a processor provides software control of memory-level parallelism, according to an embodiment of the present invention.

Functional units 272A to 272D, register file 271, and scoreboard 273 are illustrative only and are not intended to limit the invention to the specific layout illustrated in FIG. 2. A processor 270 may include multiple processors on a single chip. Each of the multiple processors may have an independent register file and scoreboard or the register file and scoreboard may, in some manner, be shared or coupled. Similarly, register file 271 may be made of one or more register files. In view of this disclosure, those of skill in the art can implement instruction 235 for a particular processor architecture and operating system of interest. Also, when it is stated herein that an instruction, software, source program, or program code takes an action or actions, those of skill in the art appreciate that the action or actions are the result of execution of an appropriate computer program instruction or instructions.

Instruction 235, which makes scoreboard 273 visible to the programmer, provides a new level of control and information to the programmer and allows the programmer to explicitly control program flow to achieve greater memory-level parallelism. This new functionality also is particularly useful for explicit programmer control of garbage collection and data speculation, for example. See commonly assigned and commonly filed, U.S. patent application Ser. No. 11/082,281, entitled "Method and Structure for Explicit Software Control of Data Speculation," of Christof Braun, Quinn A. Jacobson, Shailender Chaudhry and Marc Tremblay, filed on Mar. 16, 2005 and U.S. patent application Ser. No. 11/083,163, entitled "Method and Structure for Explicit Software Control of Execution of A Thread Including a Helper Subthread," of Christof Braun, Quinn A. Jacobson, Shailender Chaudhry and Marc Tremblay, filed on Mar. 16, 2005, each of which is incorporated herein by reference in its entirety.

Figure 3:
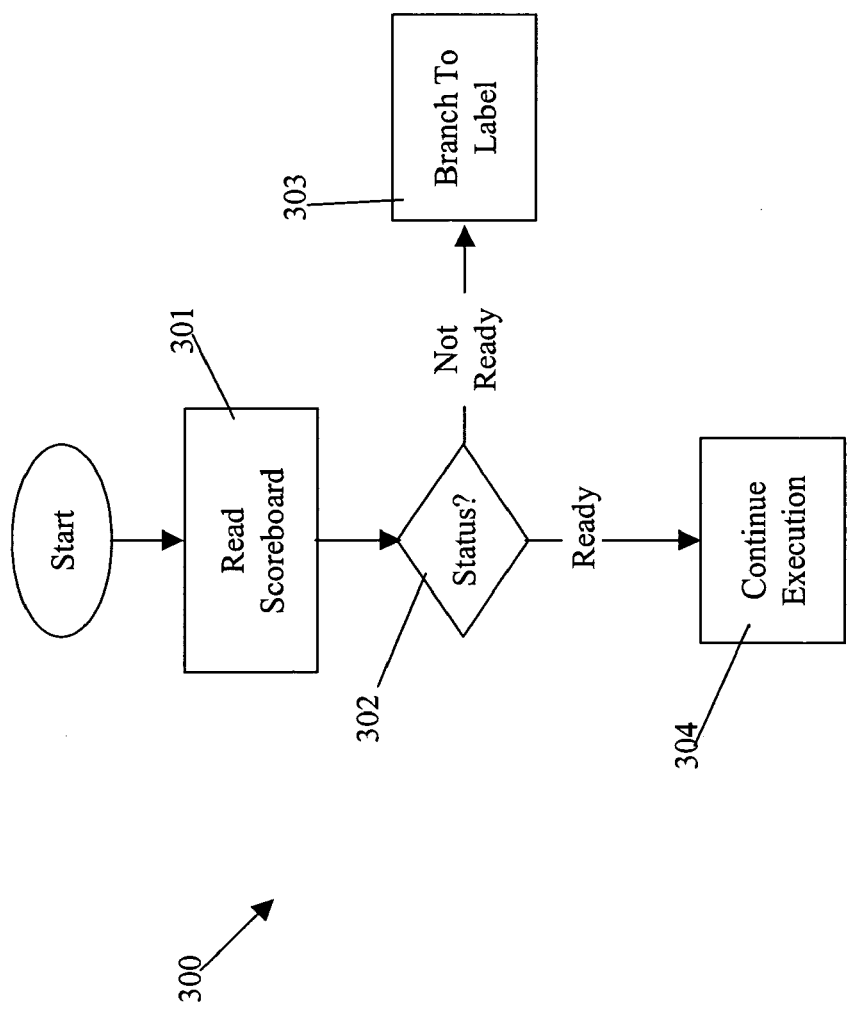
FIG. 3 is a process flow diagram for a branch on status method that results from executing an embodiment of the branch on status instruction, according to an embodiment of the present invention.

In one embodiment, instruction 235 is a branch on status instruction. An embodiment of the branch on status instruction is a branch on register status instruction that in turn is, in one embodiment, a branch if not ready instruction, e.g., the register status is "not ready." FIG. 3 is a process flow diagram of one embodiment of a method 300 that results from execution of the branch if not ready instruction. The format for one embodiment of the branch if not ready instruction is:

Branch_if_not_ready % reg label where
% reg is a register in scoreboard 273, which in this embodiment is a hardware instruction scoreboard, and
label is a label in code segment 232.
//
//
//
//
//
//
//

A pseudo code example using this instruction is:

$$\left.\begin{array}{l}\text{load [ ] \%reg}\\ \text{...}\\ \text{Branch\_if\_not\_ready \%reg, label}\\ \text{use \%reg}\\ \text{...}\end{array}\right\}\text{First Code Segment}$$

$$\left.\begin{array}{l}\text{label:}\\ \text{...}\end{array}\right\}\text{Second Code Segment}$$

In operation 301, processor 270 reads the status, and not the value, of register % reg from hardware instruction scoreboard 273. Operation 301 transfers processing to status check operation 302.

Status check operation 302 determines the status of register % reg, as read from scoreboard 273. If the status of register % reg is "not ready," status check operation 302 transfers processing to branch to label operation 303. Branch to label operation 303 in turn transfers processing to label in the second code segment. If the status of register % reg is "ready," status check operation 302 transfers processing to continue execution operation 304. Continue execution operation 304 continues execution of the first code segment because the value in register % reg is ready for use.

Figure 4:
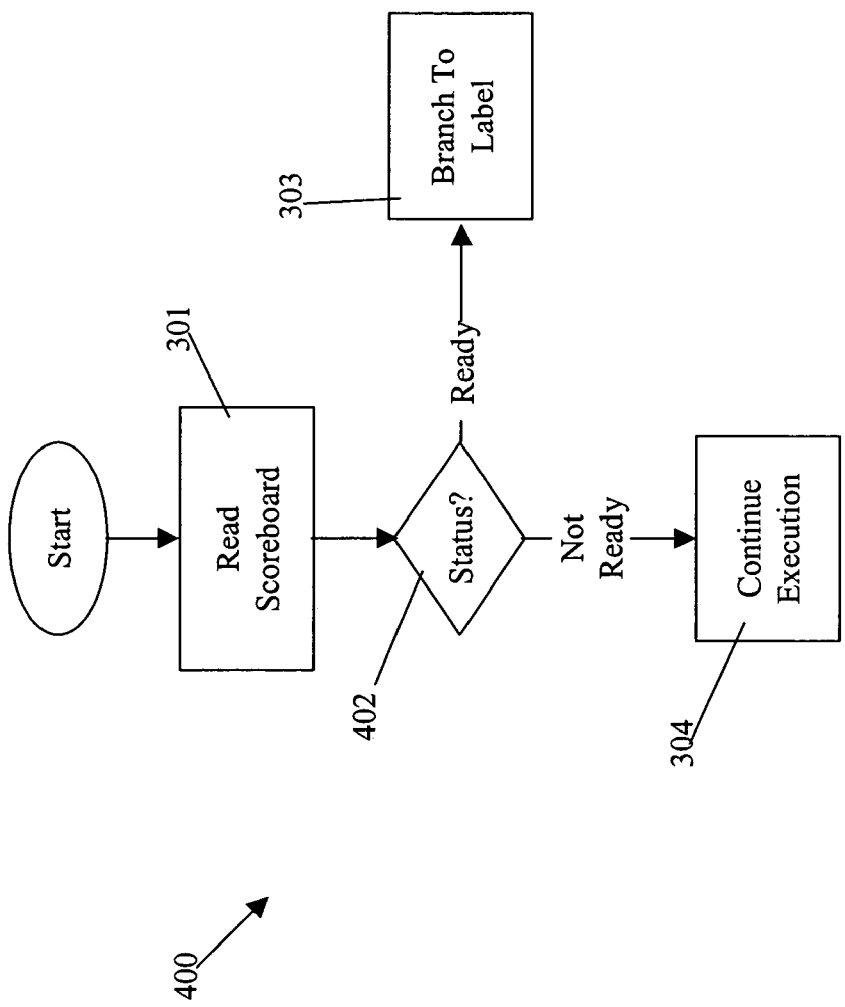
FIG. 4 is a process flow diagram for a branch on status method that results from executing another embodiment of the branch on status instruction, according to an embodiment of the present invention.

The above example of instruction 235 was illustrative only. Another example of a branch on register status instruction is a branch if ready instruction. FIG. 4 is a process flow diagram of one embodiment of a method 400 that results from execution of the branch if ready instruction. The format for one embodiment of the branch if ready instruction is:

Branch_if_ready % reg label where
% reg is a register in scoreboard 273, which in this embodiment is a hardware instruction scoreboard, and
label is a label at the start of code segment 232.
A pseudo code example using this instruction load [ ] % reg $$\left.\begin{array}{l}\text{load [ ] \%reg}\\ \text{...}\\ \text{Branch\_if\_ready \%reg, label}\\ \text{...}\end{array}\right\}\text{First Code Segment}$$

$$\left.\begin{array}{l}\text{label:}\\ \text{use \%reg}\\ \text{...}\end{array}\right\}\text{Second Code Segment}$$

Method 400 is equivalent to method 300 described above except status check operation 402 transfers processing to branch to label operation 303 if the status is "ready" and to continue execution operation 304 if the status is "not ready." The above descriptions of operations 301, 302 and 304 are incorporated herein by reference.

Thus, in these embodiments of the branch on status instruction, processor 170 includes two new branch instructions that enable software to test scoreboard 273 that also is used in hardware scheduling. These novel branch on status instructions check if an instruction that used the register as a source operand would stall waiting for a previous operation to complete or would be able to execute immediately. These instructions enable software to dynamically adapt to data dependencies.

A common use of these branch on status instructions is to check if a load instruction had completed. For a processor that has a non-blocking load architecture, a program can issue a load instruction and then wait an appropriate time and issue one of these new branch on status instructions to test if the load had completed or is still waiting on a cache miss. Depending if the load data were already available, the software could either issue a use for the load data or perform potentially independent work before using the load data.

These new branch on status instructions test the scoreboard at the time the branch on status instruction is dispatched. It is therefore important that code making use of these branch on status instructions understand the dispatch grouping rules and the expected latency of operations. If a branch on not ready instruction were issued immediately after a load instruction, the instruction would typically see the load as not ready because for example, the load has a three cycle minimum latency even for the case of level-one data cache hit.

The above examples are illustrative only and are not intended to limit the invention to the specific examples used. The branch on status instructions also could be based on the status of functional units since the status of functional units is typically included in the scoreboard. For example, the branch on status test could be used for variable latency operations such as a division operation. Using the branch instructions for results from functional units provides an enhancement of both instruction level parallelism and memory level parallelism.

In one embodiment, the two novel branch on status instructions are defined based on the SPARC Architecture. See for example, David L. Weaver/Tom Germond, Editors, *The SPARC Architecture Manual*, Version 9, SPARC International, Inc., San Jose, Calif., SA-V09-R147-Jul2003, which is published by Prentice Hall, Englewood Cliffs, N.J. 07632, U.S.A. with ISBN 0-13-825001-4, which is incorporated herein by reference to show information known to those of skill-in-the-art. The two instructions are (i) a branch on integer register not ready with prediction instruction, and (ii) a branch on integer register ready with prediction instruction.

In this embodiment, these branch on status instructions are implemented by using experimental instructions that utilize opcodes that are otherwise illegal instructions in the SPARC Architecture. An Experimental Control Register enables experimental instructions. If an experimental instruction is not enabled, an attempt to execute that opcode causes an illegal instruction trap.

TABLE 1 defines opcodes for the two branch on integer register status with prediction instructions along with the values of field rcond that uniquely identifies the instructions.

TABLE 1

| Instruction | rcond | Operation | Register Test |
|---|---|---|---|
| BRR | 000 | Branch on Register Ready | r[rs1] ready for immediate use |
| BRNR | 100 | Branch on Register Not Ready | r[rs1] not ready for immediate use |

Figure 5:
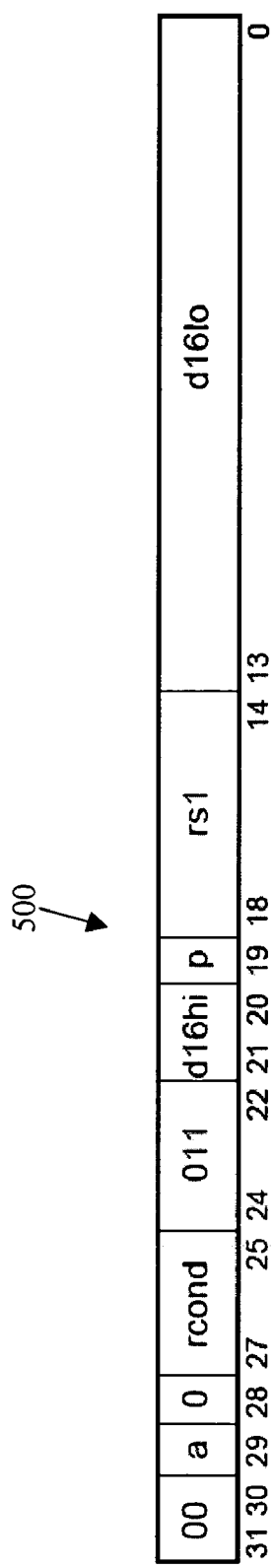
FIG. 5 is an illustration of a specific embodiment of the branch on status instruction, according to an embodiment of the present invention.

FIG. 5 is an illustration of a format 500 for the instructions of TABLE 1. In FIG. 5, two-bit field d16hi and fourteen-bit field d16lo together are a word-aligned, sign-extended, program counter relative displacement for the branch. Five-bit field rs1 is the address of the first integer register r source operand. One-bit branch prediction field p encodes a static prediction for the instructions as presented in

TABLE 2

| p | Branch Prediction |
|---|---|
| 0 | Predict branch will not be taken |
| 1 | Predict branch will be taken |

Three-bit field rcond selects the register-contents status to test for a branch on integer register status with prediction instruction. One-bit annul field a, upon being set, annuls the execution of the following instruction if the branch is conditional and untaken, or if the branch is unconditional and taken.

The assembly level syntax for the two branch on integer register status with prediction instructions is:

TABLE 3 brr{,a}{,pt|,pn} regrs1, label
brnr{,a}{,pt|,pn} regrs1, label

To set annul bit a for the two instructions, an ",a" is appended to the opcode mnemonic. For example, use "brr,a % i3, label." In TABLE 3, braces signify that the ",a" is optional. To set branch prediction bit p, append either ",pt" for predict taken or ",pn" for predict not taken to the opcode mnemonic. If neither ",pt" nor ",pn" is specified, the assembler defaults to ",pt" in this embodiment.

Figure 6:
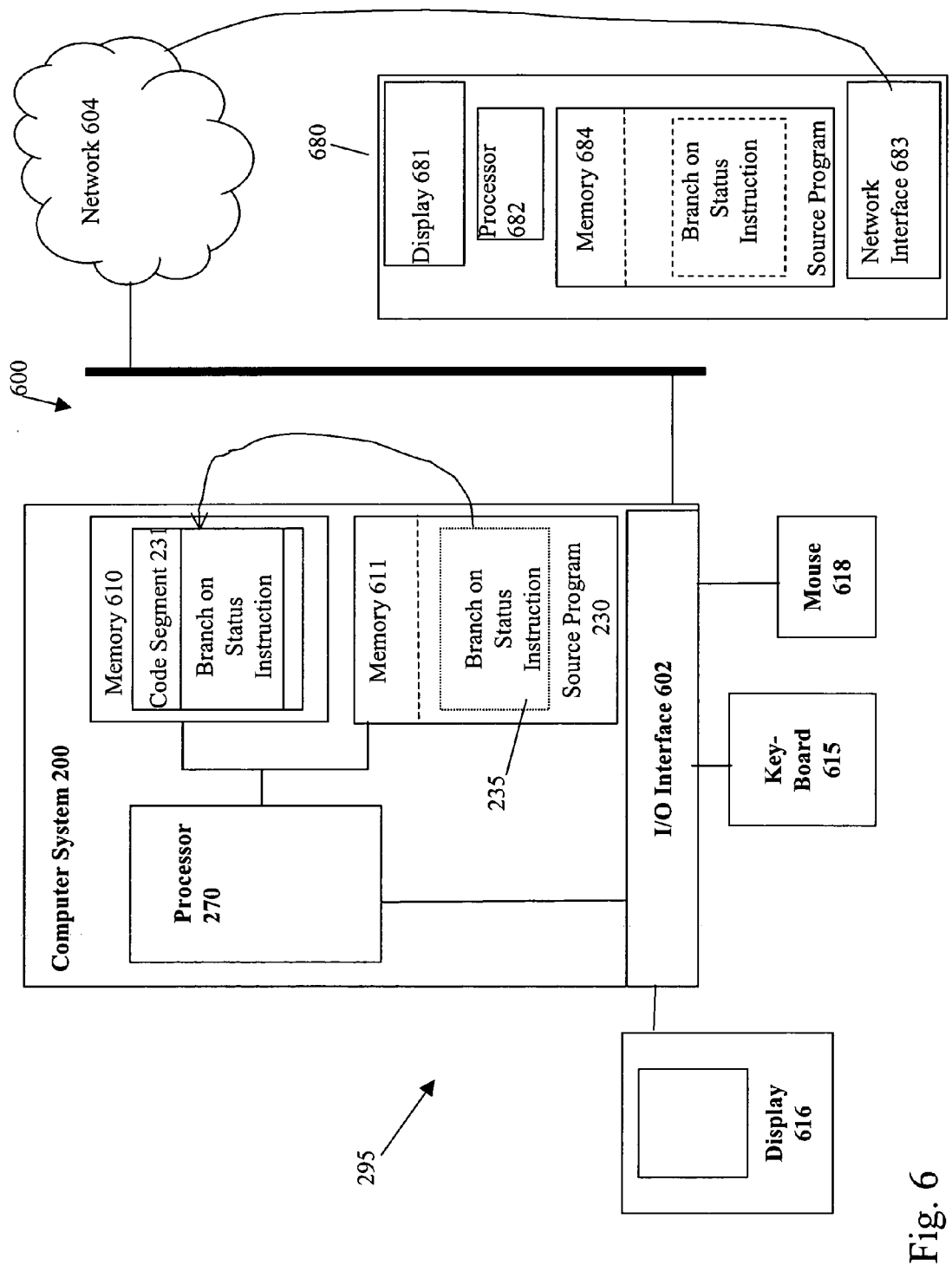
FIG. 6 is a high-level network system diagram that illustrates several alternative embodiments for using a source program including a branch on status instruction that provides explicit software control of the memory-level parallelism.

Those skilled in the art readily recognize that in this embodiment the individual operations mentioned before in connection with the branch on status embodiment of instruction 235 (FIG. 6), are performed by executing a computer program instruction on processor 270 of computer system 200. In one embodiment, a storage medium 611 has thereon installed computer-readable program code that includes instruction 235, and execution of the computer-readable program code causes processor 270 to perform the individual operations explained above for methods 300 and/or method 400.

In one embodiment, computer system 200 is a hardware configuration like a personal computer or workstation. However, in another embodiment, computer system 200 is a client-server computer system 600. For either a client-server computer system or a stand-alone computer system, memory 220 typically includes both volatile memory 610, such as main memory, and non-volatile memory 611, such as hard disk drives. In still another embodiment, computer system 200 is contained in a single package.

While memory 220 (FIG. 2) is illustrated as a unified structure, this should not be interpreted as requiring that all memory in memory 220 be at the same physical location. All or part of memory 220 can be in a different physical location than processor 270. For example, instruction 235 may be stored in memory that is physically located in a location different from processor 270.

Processor 270 should be coupled to the memory containing instruction 235. This could be accomplished in a client-server system 600, or alternatively via a connection to another computer via modems and analog lines, or digital interfaces and a digital carrier line. For example, all of part of memory 220 could be in a World Wide Web portal, while processor 270 is in a personal computer, for example.

More specifically, computer system 200, in one embodiment, can be a portable computer, a workstation, a server computer, or any other device that can execute instruction 235. Similarly, in another embodiment, computer system 200 can be comprised of multiple different computers, wireless devices, server computers, or any desired combination of these devices that are interconnected to perform, method 300 and/or method 400, as described herein.

Herein, a computer program product comprises a medium configured to store computer readable code for instruction 235 or in which computer readable code for instruction 235 is stored. Some examples of computer program products are CD-ROM discs, ROM cards, floppy discs, magnetic tapes, computer hard drives, and servers on a network.

Herein, a computer memory refers to a volatile memory, a non-volatile memory, or a combination of the two. Similarly, a computer input unit, e.g., keyboard 615 and/or mouse 618, and a display unit 616 refer to the features providing the required functionality to input the information described herein, and to display the information described herein, respectively, in any one of the aforementioned or equivalent devices.

In view of this disclosure, instruction 235 can be implemented in a wide variety of computer system configurations using an operating system and computer programming language of interest to the user. In addition, instruction 235 could be stored on a first device and executed on a different device. For example, instruction 235 could initially be stored in a server computer, and then as necessary, a module of containing instruction 235 could be transferred to a client device and executed on the client device.

In yet another embodiment, the module containing instruction 235 is stored in a memory of another computer system. The stored module is transferred, over a network to memory 220 in system 200.

The computer program including instruction 235 may be stored on any common data carrier like, for example, a floppy disk or a compact disc (CD), as well as on any common computer system's storage facilities like hard disks. Therefore, one embodiment of the present invention also relates to a data carrier for storing a computer program for carrying out the inventive method. Another embodiment of the present invention also relates to a method for using a computer system for carrying out method 300 and/or method 400. Still another embodiment of the present invention relates to a computer system with a storage medium on which a computer program including instruction 235 is stored.

While instruction 235 hereinbefore has been explained in connection with various embodiments thereof, those skilled in the art will readily recognize that modifications can be made to these embodiments without departing from the spirit and scope of the present invention. For example, in the above examples, the status information was obtained from a scoreboard. However, as is known to those of skill in the art, status information can be obtained in a variety of ways, for example, ready bits. Thus, the use of a scoreboard is illustrative of a mechanism for providing status information that can be sampled, and so scoreboard should be interpreted as including other techniques used to represent status information within a processor that can be sampled using a software instruction.

We claim:

1. A computer-based method comprising:
   reading, from a scoreboard, a status of information needed for execution of a second computer program instruction in a computer source program in execution of a first computer program instruction in said computer source program;
   continuing with execution of said second computer program instruction upon said status being a first status; and
   continuing, alternatively, with execution of a third computer program instruction of said computer source program upon said status being a second status different from said first status.

2. The computer-based method of claim 1, wherein said first computer instruction comprises a branch on status instruction.

3. The computer-based method of claim 1, wherein said first computer instruction comprises a branch on ready instruction.

4. The computer based method of claim 3 wherein said branch on ready instruction comprises a branch on integer register ready instruction.

5. The computer-based method of claim 1, wherein said first computer instruction comprises a branch on not ready instruction.

6. The computer based method of claim 5 wherein said branch on not ready instruction comprises a branch on integer register not ready instruction.

7. The computer-based method of claim 1 wherein said status is associated with a functional unit.

8. The computer-based method of claim 1 wherein said status is associated with a register.

9. A structure comprising:
   means for reading, from a scoreboard, a status of information needed for execution of a second computer program instruction in a computer source program in execution of a first computer program instruction in said computer source program;
   means for continuing with execution of said second computer program instruction upon said status being a first status; and
   means for continuing, alternatively, with execution of a third computer program instruction of said computer source program upon said status being a second status different from said first status.

10. A computer system comprising:
    a processor; and
    a memory coupled to the processor and having stored therein instructions wherein execution of the instructions on the processor provides a method comprising:
       reading, from a scoreboard, a status of information needed for execution of a second computer program instruction in a computer source program in execution of a first computer program instruction in said computer source program;
       continuing with execution of said second computer program instruction upon said status being a first status; and
       continuing, alternatively, with execution of a third computer program instruction of said computer source program upon said status being a second status different from said first status.

11. A computer-program product comprising a medium of a common data carrier having stored therein computer readable code for a method comprising:
    reading, from a scoreboard, a status of information needed for execution of a second computer program instruction in a computer source program in execution of a first computer program instruction in said computer source program;
    continuing with execution of said second computer program instruction upon said status being a first status; and
    continuing, alternatively, with execution of a third computer program instruction of said computer source program upon said status being a second status different from said first status.

12. A computer-based method comprising:
    exposing a scoreboard of a processor on execution of a branch on status software instruction, on said processor, in a computer source program; and
    explicitly controlling by said execution of said branch on status instruction which software instruction of a multiplicity of software instructions in said computer source program is executed, on said processor, after execution of said branch on status software instruction wherein said explicitly controlling reads a status of information in said scoreboard exposed on said execution of said branch on status software instruction to determine whether to branch to a label included in said branch on status instruction.

13. The computer-based of claim 12, wherein said branch on status software instruction comprises a branch on ready instruction.

14. The computer-based method of claim 12, wherein said branch on status software instruction comprises a branch on not ready instruction.

15. A system comprising:
    a processor;
    a scoreboard; and a memory, coupled to said processor, storing a branch on status instruction,
wherein upon execution of said branch on status instruction on said processor, said processor exposes said scoreboard to said branch on status instruction; said execution of said branch on status instruction reads a status of information from said scoreboard; and said execution of said branch on status instruction determines whether to branch to a label in said branch on status instruction based on said status.

16. The system of claim 15 wherein said scoreboard is included within said processor.

17. A structure comprising:
means for exposing a scoreboard of a processor on execution of a branch on status software instruction, on said processor, in a computer source program; and
means for explicitly controlling by said execution of said branch on status instruction which software instruction of a multiplicity of software instructions in said computer source program is executed, on said processor, after execution of said branch on status software instruction wherein said means for explicitly controlling reads a status of information in said scoreboard exposed on said execution of said branch on status software instruction to determine whether to branch to a label specified in said branch on status instruction.

18. A computer-program product comprising a medium of a common data carrier having stored therein computer readable code for a method comprising:
exposing a scoreboard of a processor on execution of a branch on status software instruction, on said processor, in a computer source program; and
explicitly controlling by said execution of said branch on status instruction which software instruction of a multiplicity of software instructions in said computer source program is executed, on said processor, after execution of said branch on status software instruction wherein said explicitly controlling reads a status of information in said scoreboard exposed on said execution of said branch on status software instruction to determine whether to branch to a label specified in said branch on status instruction.

* * * * *

UNITED STATES PATENT AND TRADEMARK OFFICE
CERTIFICATE OF CORRECTION

PATENT NO. : 7,711,928 B2 Page 1 of 1
APPLICATION NO. : 11/082282
DATED : May 4, 2010
INVENTOR(S) : Marc Tremblay, Shailender Chaudhry and Quinn A. Jacobson It is certified that error appears in the above-identified patent and that said Letters Patent is hereby corrected as shown below:

In Column 10, Line 59, Claim 13, after "computer-based", insert --method--.

Signed and Sealed this

Twenty-ninth Day of June, 2010

David J. Kappos
*Director of the United States Patent and Trademark Office*